US009268087B2

(12) United States Patent
Miller et al.

(10) Patent No.: US 9,268,087 B2
(45) Date of Patent: Feb. 23, 2016

(54) APPARATUS FOR SELECTIVE FIBER OPTICAL CHANNEL MONITORING AND CHANNEL REPLICATION OF WAVELENGTH DIVISION MULTIPLEXED (WDM) SIGNALS

(71) Applicants: Gary Evan Miller, Holly Springs, NC (US); Otis James Johnston, Raleigh, NC (US)

(72) Inventors: Gary Evan Miller, Holly Springs, NC (US); Otis James Johnston, Raleigh, NC (US)

(73) Assignee: M2 OPTICS, INC., Holly Springs, NC (US)

( * ) Notice: Subject to any disclaimer, the term of this patent is extended or adjusted under 35 U.S.C. 154(b) by 0 days.

(21) Appl. No.: 14/205,368

(22) Filed: Mar. 12, 2014

(65) Prior Publication Data
US 2014/0376855 A1    Dec. 25, 2014

Related U.S. Application Data

(60) Provisional application No. 61/956,957, filed on Jun. 20, 2013.

(51) Int. Cl.
*G02B 6/00*    (2006.01)
*G02B 6/12*    (2006.01)

(52) U.S. Cl.
CPC .................... *G02B 6/12014* (2013.01)

(58) Field of Classification Search
CPC .................................................. G02B 6/12014
See application file for complete search history.

(56) References Cited

U.S. PATENT DOCUMENTS

| | | | | |
|---|---|---|---|---|
| 5,896,212 A * | 4/1999 | Sotom | ................. | H04J 14/0227 398/1 |
| 5,937,117 A * | 8/1999 | Ishida | ................ | H04Q 11/0005 385/24 |
| 6,906,804 B2 * | 6/2005 | Einstein | .................... | G01J 9/04 356/484 |
| 7,330,620 B2 * | 2/2008 | Ishida | .................... | G02B 6/125 385/129 |
| 7,542,675 B1 * | 6/2009 | Graves | ............... | H04Q 11/0005 398/45 |
| 2002/0118418 A1 * | 8/2002 | Khalfallah | .......... | H04J 14/0212 398/82 |
| 2003/0185565 A1 * | 10/2003 | Wang | .................. | H04J 14/0212 398/49 |
| 2003/0228091 A1 * | 12/2003 | Lee | ..................... | G02B 6/12019 385/18 |
| 2004/0096217 A1 * | 5/2004 | Parker | ................ | G02B 6/12011 398/39 |
| 2005/0226621 A1 * | 10/2005 | Kikuchi | ................ | H04J 14/021 398/83 |
| 2006/0023996 A1 * | 2/2006 | Nakagawa | .......... | H04J 14/0206 385/24 |
| 2006/0198575 A1 * | 9/2006 | Doerr | ................. | G02B 6/12011 385/18 |
| 2009/0232447 A1 * | 9/2009 | Boduch | ............... | H04J 14/0204 385/24 |
| 2012/0087668 A1 * | 4/2012 | Li | ....................... | H04L 27/2628 398/79 |
| 2012/0230690 A1 * | 9/2012 | Doerr | ................. | G02B 6/12033 398/49 |
| 2014/0376855 A1 * | 12/2014 | Miller | ................ | G02B 6/12014 385/14 |

* cited by examiner

*Primary Examiner* — Danny Leung
(74) *Attorney, Agent, or Firm* — Douglas A. Pinnow

(57) ABSTRACT

An apparatus for selective fiber optical channel monitoring and channel replication of wavelength division multiplexed (WDM) signals is constructed by combining a dispersive element, such as an arrayed waveguide grating (AWG), with a multiplicity of simple 1×1 optical switches and either an optical splitter/combiner or a second AWG. In operation, each optical channel in a WDM group may be sequentially monitored or replicated. When this apparatus is preceded by an N×1 optical switch, any optical channel on any one of N input optical fibers to the switch may be selected for monitoring or replication.

7 Claims, 4 Drawing Sheets

APPARATUS FOR SELECTIVE FIBER OPTICAL CHANNEL MONITORING AND CHANNEL REPLICATION OF WAVELENGTH DIVISION MULTIPLEXED (WDM) SIGNALS

CROSS-REFERENCES TO RELATED APPLICATIONS

This application claims the benefit of (1) U.S. Provisional Patent Application 61/851,968 filed Mar. 13, 2013, (2) U.S. Provisional Patent Application Ser. No. 61/854,402 filed Apr. 22, 2013, and (3) U.S. Non-Provisional application Ser. No. 14/072,528 filed Nov. 5, 2013, the contents of which are hereby incorporated by reference herein.

TECHNICAL FIELD AND INDUSTRIAL APPLICABILITY OF THE INVENTION

The present invention relates to an apparatus for selective fiber optical channel monitoring and channel replication of wavelength division multiplexed (WDM) signals in modern fiber optical communication systems.

BACKGROUND OF INVENTION

Reference (1) includes a discussion of the broad reach of fiber optical communications systems into the modern world and the specific need to monitor individual fiber optic links in these systems for fiber breakage so that failed links may be quickly be identified and automatically corrected by quickly switching a spare optical fiber into service. The inventive contribution made in Reverence (1) was a cost effective optical switching apparatus that could sequentially direct tapped optical signals from fiber optic transmission links to monitoring equipment that could detect fiber breaks in several seconds or less. This same switching apparatus could also be used to replicate optical signals for broadcast and multimedia applications.

In many cases, there is a need not only to monitor optical fibers used in modern communication systems for continuity (lack of breaks) but also to monitor the performance of each of a multiplicity of optical channels carried by each individual fiber in a wavelength division multiplexed (WDM) format. For example, it is important to detect and identify when a laser diode that serves as the optical source for one of many WDM channels on a fiber has failed or is approaching failure due to a declining power output.

WDM is a well established method for increasing the information carrying capacity of individual fibers. Depending on the system application, the number of optical channels that are wavelength division multiplexed range from several channels, referred to as Coarse WDM (or CWDM), to 160 channels or more, referred to as Dense WDM (or DWDM). In either case, WDM leads to a beneficial reduction in the total number of optical fibers required to convey some specified amount of information or data. However, in order for WDM to be a cost effective strategy, the cost for monitoring the individual channels multiplexed onto a fiber must be reasonably modest. While the state-of-the-art for monitoring has reached this threshold using MEMS technology previously discussed in Reference (1), further improvements to reduce the complexity and expense of the monitoring function would be welcomed.

The state-of-the-art for channel monitoring is to direct the output of a WDM optical fiber into a dispersive Planar Lightwave Circuit (PLC) such as an Arrayed Waveguide Grating (AWG), that is well known in the art, to split up a multiplicity of WDM channels (say, N channels) carried on a single input fiber into a group of single channels carried on a multiplicity N of individual output fibers with one channel on each fiber. Then, an optical switch, similar to the MEMS switch described in Reference (1), is used to sequentially direct the channel outputs to an optical monitoring device (test set).

Clearly, it would be desirable to make this switching function more cost effective. It would also be desirable if this cost effective alternative switching apparatus could also be used for other applications such as optical signal replication.

Also see U.S. Pat. No. 7,330,620 B2 and, U.S. Patent Application Publication Nos. 2009/0232447 A1. 2012/0087668 A1, and 2012/0230690 A1.

BRIEF SUMMARY OF THE INVENTION

The present invention relates to an improved method for monitoring WDM optical channels or replicating individual optical channels that are multiplexed on a single fiber. Broadly speaking, the concept is to replace a rather expensive MEMS switch that is presently used for this function (see WHITE PAPER from JDS Uniphase Corporation "A Performance Comparison of WSS [Wavelenght Selective Switching] Switch Engine Technology", Document 30162724, May 2009 on www.jdsu.com.) with a group of 1×1 optical switches in conjunction with an optical combiner device such as a splitter/combiner or AWG in a cost effective manner.

The present approach employs a dispersive component such as an Arrayed Waveguide Grating (AWG) to split up a multiplicity of WDM channels on a single input fiber into a group of single channels on a multiplicity of individual output waveguides with one channel on each waveguide. In this case, a waveguide may be either an optical fiber or a guided pathway in Planar Lightwave Circuit (PLC) (See "Planar lightwave circuit devices for optical communications present and future" by Hiroshi Takahashi et al, Proceedings of the SPIE, Vol. 5246 (2003) pp 520-530.). At present, the use of an optical fiber is usually the most economic choice for the waveguide. However, PLC technology is expected to become preferred for this waveguide in the future because these circuits are expected to become less expensive and to fit into smaller package sizes.

Rather than using an expensive MEMS optical switch to sequentially direct the split channel outputs to an optical monitoring test set, the present invention employs a series of inexpensive 1×1 switches (that is, simple on/off switches) to turn off all but one selected channel. Then the single remaining active optical channel is passed through either an optical splitter/combiner, operating in the combiner mode, or through another AWG operating in the multiplexer mode to a single output fiber that is directed to the monitoring device.

Alternatively, the single optical channel on the output fiber may be replicated using a second optical splitter/combiner, operating in the splitter mode, and be broadcast (multicast) over a multiplicity of output fibers.

DETAILED DESCRIPTION OF THE INVENTION

With reference to the attached drawings, embodiments of the present invention will be described below.

Two useful functions that are included in many modern-day fiber optical communication systems are (1) monitoring individual optical channels that are multiplexed by WDM on a single optical fiber, and (2) replication of an optical signal on a single optical fiber onto a multiplicity of optical fibers. Both of these functions can be accomplished using the optical circuits and equipment disclosed in this invention. With reference to the attached drawings, embodiments of the present invention will be described below.

Figure 1:
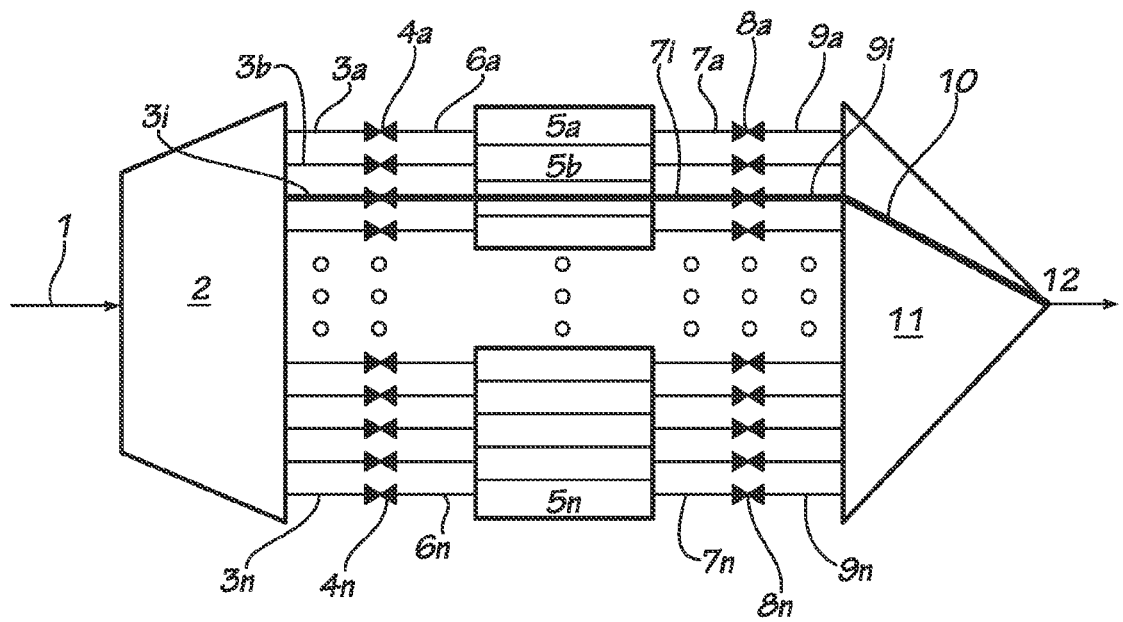
FIG. 1 shows an optical circuit diagram for an optical demultiplexer employing an AWG, an array of 1×1 optical switches and an optical splitter/combiner that can be used to select a single optical channel from a WDM group of channels for purposes of monitoring.

FIG. 1 shows an optical circuit diagram for a specialized optical demultiplexer employing an AWG, an array of 1×1 optical switches, and an optical splitter/combiner that can be used to select a single optical channel from a WDM group of channels for purposes of monitoring. A single input fiber 1 on the left carrying n wavelength division multiplexed (WDM) optical channels is directed to an AWG 2 which causes the WDM channels to split apart so that only a single channel is carried on each of n output optical waveguides, 3a to 3n, that are either optical fibers or planar optical waveguides. Each of these n output optical waveguides are connected using an optical connectors 4a to 4n that connect to a group of dedicated 1×1 optical switches 5a to 5n. These switches have dedicated optical waveguide entry ports 6a to 6n and exit ports 7a to 7n. The exit ports are connected to dedicated optical waveguides 9a to 9n associated with the splitter/combiner 11 using optical connectors 8a to 8n. Optical waveguides 9a to 9n may be optical fibers or planar optical waveguides. All of these optical waveguides, 9a to 9n, are introduced into optical splitter/combiner 11 and the output of this splitter/combiner is an optical fiber 12 that carries only a single optical channel. This fiber is directed to an optical channel monitor device (test set).

In operation, the AWG 2 spatially disperses the n WDM optical channels carried by optical fiber 1 in close analogy to the way a prism disperses a white light beam into a rainbow of discrete colors. Carrying the analogy further, an incident white light beam may be properly thought of as a wavelength division multiplex of all of the colors that are demultiplexed by the prism into spatially separated color channels that form the rainbow. In the case of fiber optical communication systems, the multiplexed light beam is usually comprised in a multiplicity of closely spaced infrared wavelengths, lambda-a through lambda-n that each carries information in a modulated format. All but one of the n 1×1 switches 5a through 5n are turned off. The only switch that remains turned on is 5i which passes lambda-i, and is indicated by 10 in FIG. 1. This is only this optical channel that reaches the splitter/combiner 11. This channel passes through the splitter/combiner 11, (operating in a combiner mode) and is subsequently directed by the output optical fiber 12 to a monitoring device.

In practice, there are two principal types of splitter/combiners fabricated as Planar Lightwave Circuits (PLCs) that are most economical to employ on modern systems. The first type has cachinnated stages of "Y" shaped optical waveguides. The first stage splits the incident beam into 2 equal parts while the second stage splits these two optical beams into four beams and the j-th stage splits the optical beam into 2' output beams (see "Silica-on-silicon base 1×N optical splitter: Design, fabrication, and characterization", Indian Journal of Engineering and Materials Sciences, Vol. 12, February 2005, pp. 12-16). This type of optical splitter has the desirable characteristic that it tends to exhibit low optical insertion loss when operated in the combiner mode. However, it is not as commercially available as a more common "funnel" optical splitter/combiner (see U.S. Pat. No. 7,330,620) that has substantially higher optical insertion loss when operated in a combiner mode that is required for the present application.

In applications where only the funnel optical splitters are available to operate with all n wavelengths required by a system, it may be necessary to add an optical amplifier to increase the power level of the optical channel carried by fiber 12 in order to compensate for the attenuation introduced by a free-space splitter/combiner. Alternatively, the free-space splitter/combiner may be replaced by an AWG as shown in FIG. 2 and discussed next.

Figure 2:
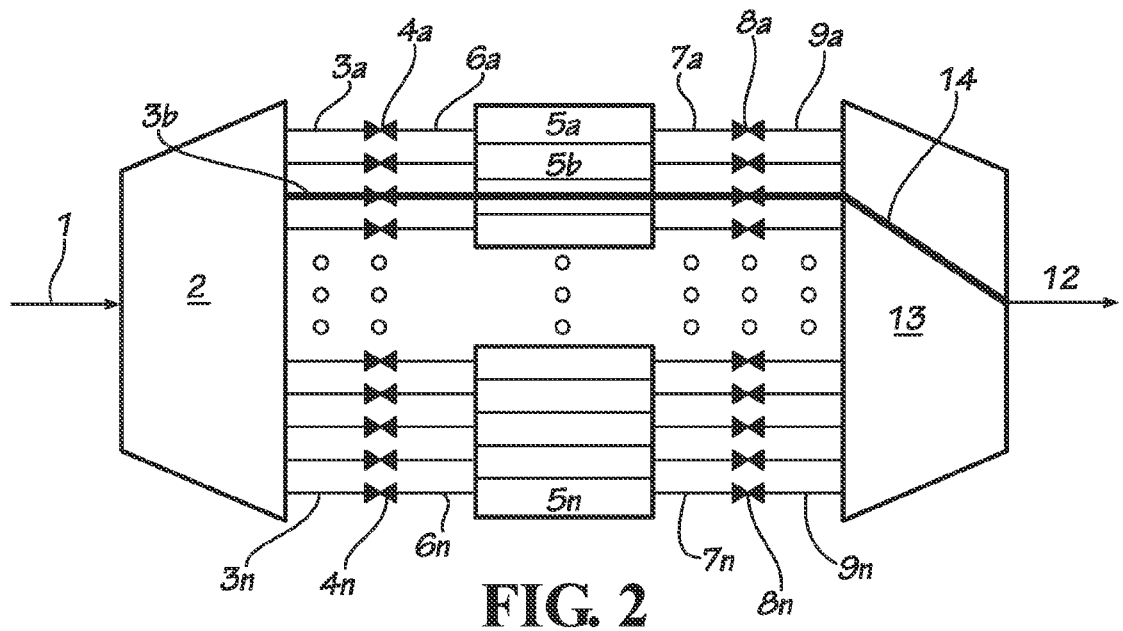
FIG. 2 is similar to FIG. 1 except that the splitter/combiner has been replaced by a second AWG.

FIG. 2 has only one component that is different from the optical circuit shown in FIG. 1. The optical splitter/combiner 11 shown in FIG. 1 is replaced by a second AWG 13 operating in a multiplexing mode. This is done to take advantage of the well known fact that the optical insertion loss for an AWG is low when operated in either the demultiplexing or multiplexing modes. In order to ensure low insertion loss, the second AWG 13 used in the multiplexer mode must be matched in characteristics to the first AWG 2 that is operated in the demultiplexer mode. In addition, it is essential that all output wavelength ports remain precisely aligned so that each output wavelength, lambda-i from the first AWG 2 goes into the corresponding input port for AWG 13. Otherwise, the optical insertion loss could become excessive.

It may appear strange that only a single optical channel 14 of wavelength, lambda-i, passes through AWG 13 in its multiplexing mode, since this is not what one would usually consider to be multiplexing. (Multiplexing usually relates to simultaneously combining more than one channel.) However, in operation of the optical circuit shown in FIG. 2, many different wavelengths pass through AWG 13, but only one at a time. In order for all of these wavelengths to experience a similar low optical insertion loss, it is necessary that they converge onto the same output fiber 12. This can happen in the multiplexing mode for any number of optical channels from 1 up to n. However, this patent application is directed to the special case where only one optical channel at a time is directed to the monitoring device.

Figure 3:
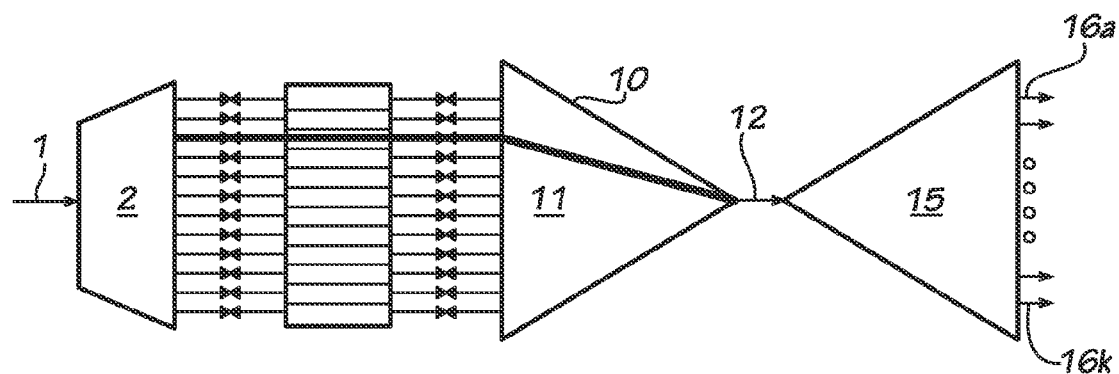
FIG. 3 shows an optical circuit diagram for an optical demultiplexer employing an AWG, an array of 1×1 optical switches and an optical splitter/combiner that can be used to select a single optical channel from a WDM group of channels for purposes of replicating or multicasting.

FIG. 3 shows a different application for the optical circuit shown in FIG. 1. Rather than directing the output of optical fiber 12 to a monitoring device, this output may be split by and optical splitter/combiner 15, into a multiplicity, k, of output channels on output fibers 16a to 16k. The optical circuit shown in FIG. 3 is useful for applications that require replicating and rebroadcasting single optical channels.

Figure 4:
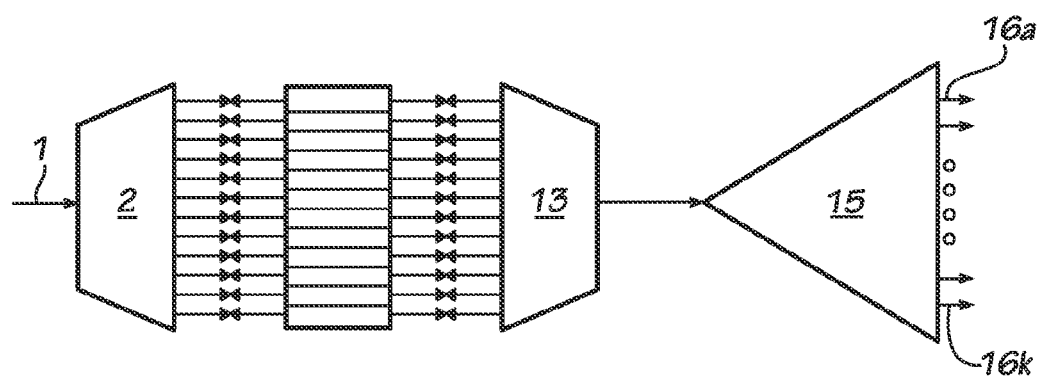
FIG. 4 is similar to FIG. 3 except that the splitter combiner has been replaced by a second AWG.

FIG. 4 shows a different application for the optical circuit shown in FIG. 2. Rather than directing the output of optical fiber 12 to a monitoring device, this output may be split by and optical splitter/combiner 15, into a multiplicity, k, of output channels on output fibers 16a to 16 k. The optical circuit shown in FIG. 4 is applicable to applications that require replicating and rebroadcasting single optical channels.

Figure 5:
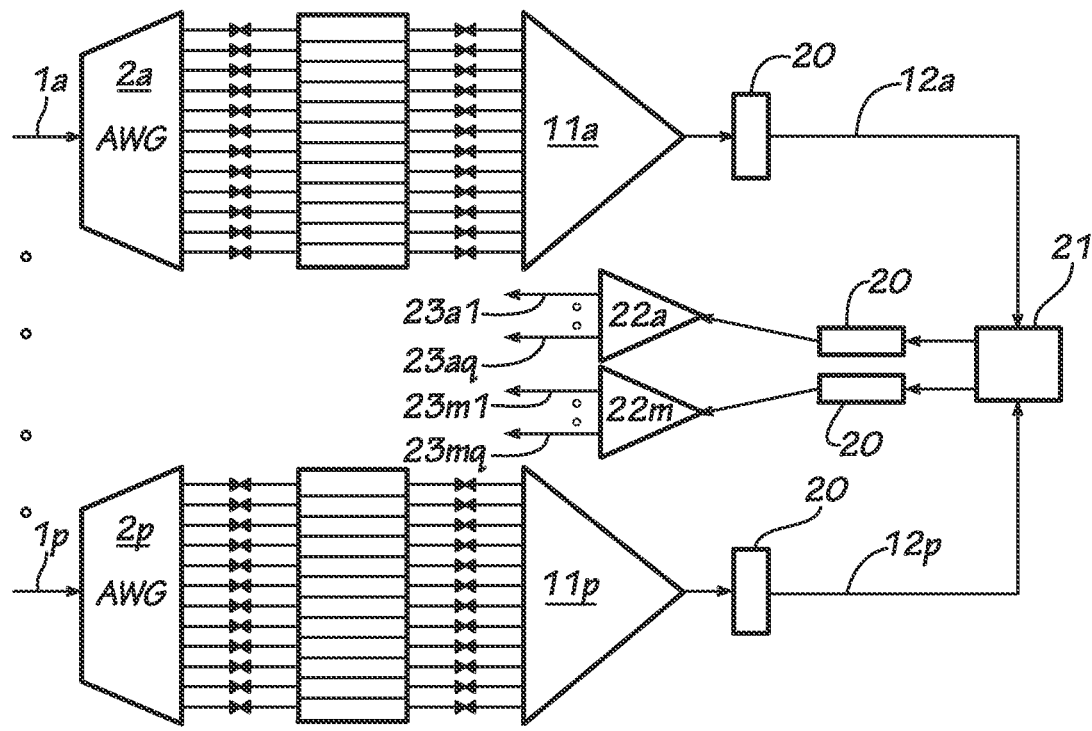
FIG. 5 is an optical circuit diagram that shows how two or more (say, p) optical demultiplexers can be connected through a p×m optical switch to produced m groups of replicated outputs using multiple splitter/combiners.

FIG. 5 shows how two or more optical circuits shown in FIG. 1 can be used in a switched mode to rebroadcast groups of single output channels that are derived from multiple input WDM optical fibers 1a to 1p. Rather than directing the outputs of optical fibers 12a to 12p to monitoring devices, these outputs may be redirected to an optical p×m switch 21 that has m output fibers each carrying a single optical channel that can be split for rebroadcasting by splitter/combiners 22a to 22 m. The optical circuit shown in FIG. 5 is suitable for applications that require replicating and rebroadcasting a multiplicity q of single optical channels on output fibers 23a1 to 23aq and 23m1 to 23mq. Optional optical amplifiers 20 may be used to increase the optical signal level if needed.

Figure 6:
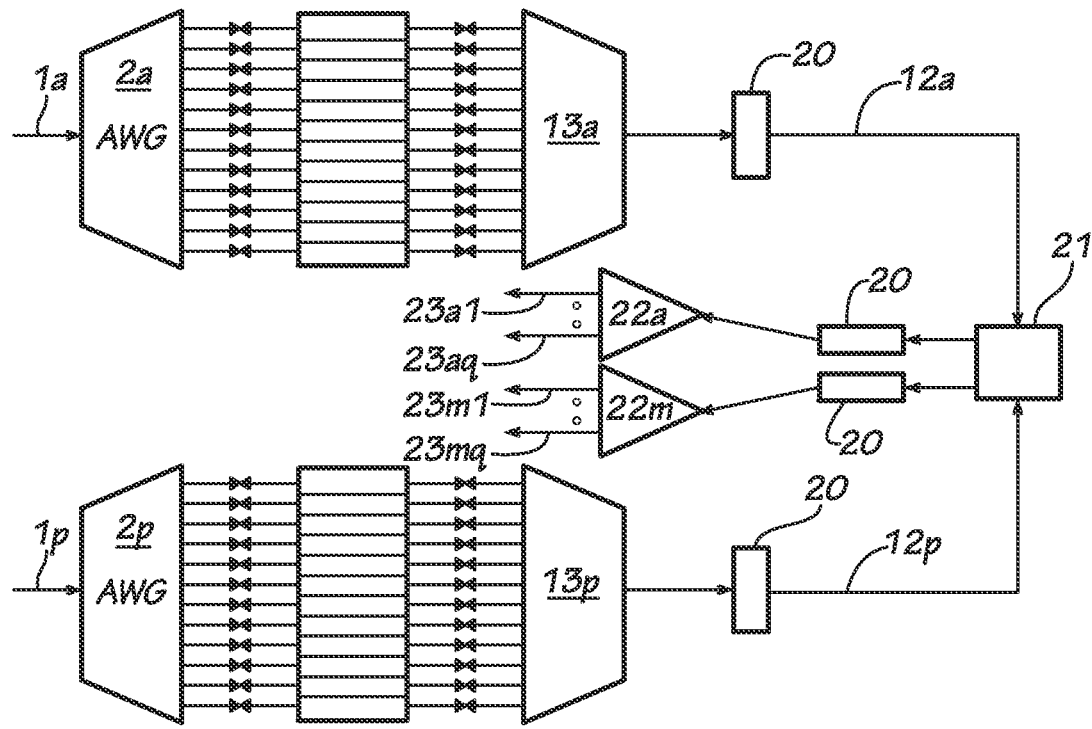
FIG. 6 is similar to FIG. 5 but the splitter/combiners associated with optical demultiplexing are replaced by AWGs.

FIG. 6 shows how two or more optical circuits shown in FIG. 2 can be used in a switched mode to rebroadcast groups of singe output channels that are derived from multiple input WDM optical fiber 1a to 1p. Rather than directing the outputs of optical fibers 12a to 12p to a monitoring device, these outputs may be redirected to a p×m optical switch 21 that has m output fibers each carrying a single optical channel that can be split for rebroadcasting by splitter/combiners 22a to 22 m. The optical circuit shown in FIG. 6 is applicable to applications that require replicating or rebroadcasting a multiplicity of single optical channels. Optional optical amplifiers 20 may be used to increase the optical signal level if needed.

Figure 7:
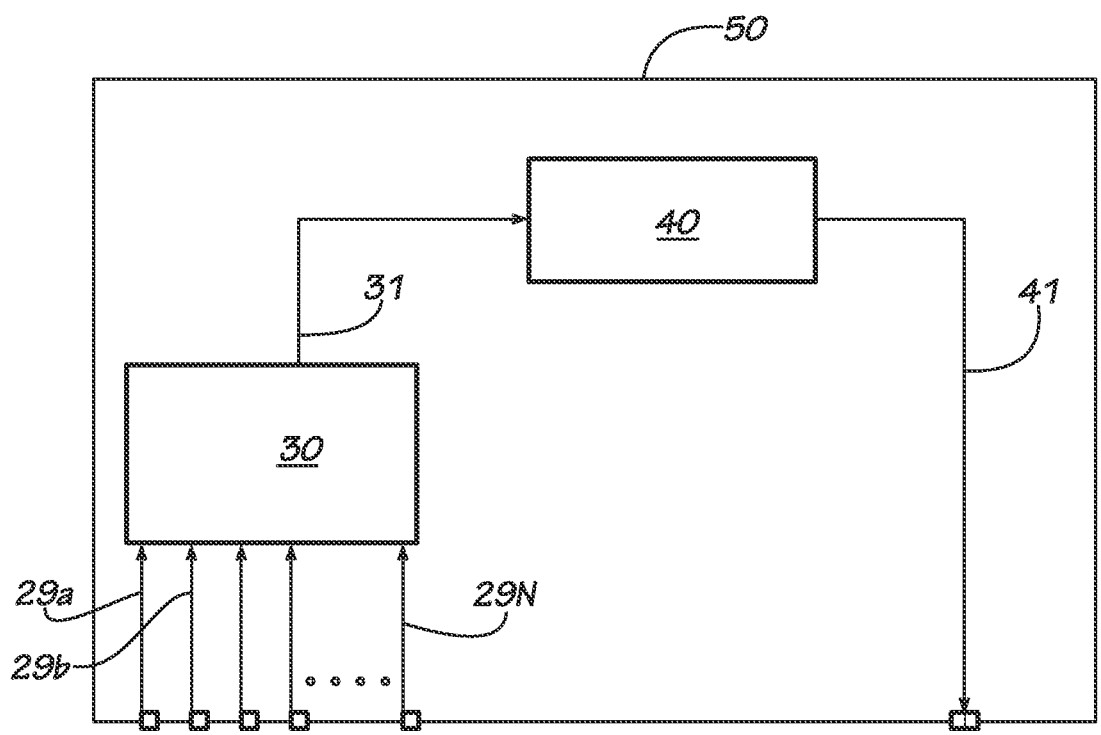
FIG. 7 shows how the optical circuits shown in FIG. 1 or 2 can be connected to an N×1 optical fiber switching circuit and housed in a common enclosure so that any single optical channel on any of a multiplicity of N input fibers carrying assorted WDM channels can be directed to an external monitoring test set. The selected channel can be changed in time so all channels on all fibers may be monitored in any sequence that is desired.

FIG. 7 Shows how an N×1 fiber switching device 30 described in Reference (1) can be connected to the optical circuit 40, as shown in either FIG. 1 or FIG. 2, so that any single optical channel on any one of the N WDM input fibers 29a to 29N can be directed to a monitoring device. All of these components may be contained in a single apparatus enclosure 50 that may be rack mounted and electrically driven by a common electronic controller similar to the one described in References (1) and (2). Alternatively the components may be in separate enclosures depending on the number of optical fibers required for various applications. In either case, the electric controller would normally be interconnected to an graphical interface unit (GUI) located outside of the apparatus enclosure through electrical cables using any of a number of convenient interface protocols such as HTML 5 for fast response. However, if a multiplicity of apparatuses are each similar to the one in FIG. 7, it is possible, for reasons of economy, to make only one of the enclosures contain the primary control electronics and all of the electronics need to interface with the external GUI.

While the above discussion of the preferred embodiments of this invention are representative, other combinations of similar optical circuit elements and enclosure designs to accomplish selective fiber optical channel monitoring and channel replication of WDM signals should be considered to be within the scope of this invention.

What is claimed is:

1. A fiber optical apparatus comprised of a multiplicity of optical circuits each optical circuit comprised of an arrayed waveguide grating (AWG) operating in the demultiplexing mode having a multiple n of optical channel outputs that are individually connected to an equal number of 1×1 optical switches which are, in turn, connected to either an optical splitter/combiner operating in the combiner mode or another arrayed waveguide grating (AWG) operating in a multiplexer mode, such that each optical circuit is suitable for demultiplexing wavelength division multiplexed (WDM) optical channels on an each input optical fiber and directing one demultiplexed channel at a time over an associated output optical fiber with all such output fibers from all optical circuits connected to a common multiple optical switch which is, in turn, connected to a multiplicity of output ports that connect to optical splitter/combiners that are all operated in the splitter mode for purposes of replicating and rebroadcasting various optical channels.

2. A first optical apparatus comprised of an N×1 optical switch with N input optical fibers carrying WDM optical signals and a single output fiber, also carrying a WDM signal, that is connected to a second optical apparatus as described in claim 1.

3. The two combined apparatuses described in claim 1 that are contained in a common enclosure that has N input optical fibers carrying WDM signals and a single output fiber carrying a single optical channel.

4. The two combined apparatuses described in claim 2 that are contained in a common enclosure that has N input optical fibers carrying WDM signals and a single output fiber carrying a single optical channel as well as an electronic control module that can be remotely instructed to select in any program sequence one specific single optical channel carried by one of the N input WDM optical fibers so that all channels on all fibers can be monitored in a limited time interval.

5. Equipment as in claim 4 that includes an internal electronic module that can control both of the optical apparatuses through a graphic user interface (GUI).

6. Equipment as in claim 5 that has a height of one Rack Unit (RU) or, equivalently, to 1.75 inches.

7. Equipment as in claim 5 that includes an internal electronic module that can control both of the optical apparatuses within the enclosure and also within one or more secondary enclosures that do not have dedicated controllers and that the equipment in the primary and secondary enclosures are interconnected by use of electrical cables.

\* \* \* \* \*